US012322088B2

(12) United States Patent
Liu et al.

(10) Patent No.: US 12,322,088 B2
(45) Date of Patent: Jun. 3, 2025

(54) DETECTING AND ENHANCING OBJECTS IN MEDICAL IMAGES

(71) Applicant: Shanghai United Imaging Intelligence Co., Ltd., Shanghai (CN)

(72) Inventors: Yikang Liu, Cambridge, MA (US); Luojie Huang, Baltimore, MD (US); Shanhui Sun, Lexington, MA (US); Zhang Chen, Brookline, MA (US); Xiao Chen, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 603 days.

(21) Appl. No.: 17/564,317

(22) Filed: Dec. 29, 2021

(65) Prior Publication Data

US 2023/0206429 A1   Jun. 29, 2023

(51) Int. Cl.
*G06T 7/00* (2017.01)
*G06N 3/02* (2006.01)
*G06V 10/762* (2022.01)
*G06V 10/82* (2022.01)

(52) U.S. Cl.
CPC ............ *G06T 7/0012* (2013.01); *G06N 3/02* (2013.01); *G06V 10/762* (2022.01); *G06V 10/82* (2022.01); *G06T 2207/10121* (2013.01); *G06T 2207/20081* (2013.01); *G06T 2207/20084* (2013.01); *G06T 2207/30104* (2013.01)

(58) Field of Classification Search
CPC . G06T 2207/20081; G06T 2207/20084; G06T 2207/30104; G06T 2207/30052; G06T 7/73; G06T 7/0012; G06T 2207/10121; G06N 3/088; G06N 3/0464; G06N 3/048; G06N 3/084; G06N 3/0455; G06N 3/02; G06V 10/762; G06V 10/82; G06V 10/44; G06V 2201/03
See application file for complete search history.

(56) References Cited

U.S. PATENT DOCUMENTS

| | | |
|---|---|---|
| 7,877,132 B2 | 1/2011 | Rongen et al. |
| 8,311,308 B2 | 11/2012 | Chen et al. |
| 8,515,146 B2 | 8/2013 | Zhu et al. |
| 9,082,158 B2 | 7/2015 | Chen et al. |
| 9,084,531 B2 | 7/2015 | Chen et al. |

(Continued)

*Primary Examiner* — Marcos L Torres
(74) *Attorney, Agent, or Firm* — Zhong Law, LLC

(57) ABSTRACT

Described herein are systems, methods, and instrumentalities associated with automatically detecting and enhancing multiple objects in medical scan images. The detection and/or enhancement may be accomplished utilizing artificial neural networks such as one or more classification neural networks and/or one or more graph neural networks. The neural networks may be used to detect areas in the medical scan images that may correspond to the objects of interest and cluster the areas belonging to a same object into a respective cluster. These tasks may be accomplished, for example, by representing the areas corresponding to the objects of interest and their interrelationships with a graph and processing the graph through the one or more graph neural networks so that the areas belonging to each object may be properly labeled and clustered. The clusters may then be used to enhance the objects of interests in one or more output scan images.

16 Claims, 7 Drawing Sheets

(56) References Cited

U.S. PATENT DOCUMENTS

| | | |
|---|---|---|
| 9,119,573 B2 | 9/2015 | Lu et al. |
| 9,855,384 B2 | 1/2018 | Cohen et al. |
| 2019/0279760 A1* | 9/2019 | Yao .................. G06Q 50/22 |
| 2021/0158929 A1* | 5/2021 | Sjolund ............... G06N 3/045 |

* cited by examiner

DETECTING AND ENHANCING OBJECTS IN MEDICAL IMAGES

BACKGROUND

Having the ability to automatically detect the locations of objects (e.g., implanted medical devices, surgical tools, etc.) inside a patient's body using medical imaging techniques is crucial to the success of many medical procedures. Using fluoroscopy as an example, this imaging technique may be used to facilitate the performance of coronary angioplasty, a procedure to open clogged heart arteries during which one or more stents may be placed. As part of the procedure, fluoroscopic images of the hearts may be taken in order to observe the heart as well as interventional devices such as stents and/or guide wires placed inside the target arteries. Due to limitation on X-ray radiation dosage, however, the captured fluoroscopic images may be noisy, which makes it difficult to locate the stents. The difficulty becomes even greater when multiple objects (e.g., multiple stents) need to be detected and tracked. Accordingly, systems, methods, instrumentalities capable of automatically detecting multiple objects in a medical image and/or enhancing the presentation of the objects in the medical image are highly desirable.

SUMMARY

Described herein are systems, methods, and instrumentalities associated with detecting and/or enhancing objects in medical scan images. An apparatus configured to perform these tasks may comprise one or more processors that may configured to receive a plurality of medical scan images and identify, using one or more artificial neural networks (ANNs), a respective first area and a respective second area in each of the plurality of medical scan images that may respectively correspond to a first object of interest and a second object of interest. The plurality of medical scan images may include, for example, fluoroscopic images and the objects of interest may include, for example, a first stent and a second stent. Responsive to detecting the first and second areas in each of the medical scan images, the one or more processors of the apparatus may be further configured to determine a first cluster that may include the respective first area in each of the plurality of medical scan images and determine a second cluster that may include the respective second area in each of the plurality of medical scan images. The one or more processors may then generate an output medical scan image depicting at least one of the first object of interest based on the first cluster or the second object of interest based on the second cluster, where the depicted first or second object of interest may be enhanced in the output medical scan image.

In examples, the one or more processors described above may be configured to determine one or more first candidate areas in each of the plurality of medical scan images and select the first area from the one or more first candidate areas. Similarly, the one or more processors may be configured to determine one or more second candidate areas in each of the plurality of medical scan images and select the second area from the one or more second candidate areas. In examples, the one or more processors may be configured to the first and second clusters described above by determining, based on the plurality of medical scan images, first features associated with the first object of interest and second features associated with the second object of interest. The one or more processors may then determine the first cluster based on the first features and the second cluster based on the second features (e.g., using a mean-shift based clustering technique).

In examples, the one or more processors described above may be configured to determine a graph representation of the respective first area and second area in each of the plurality of medical scan images and determine the first cluster and the second cluster by processing the graph representation through a graph neural network (GNN). For example, the respective first area and the respective second area in each of the plurality of medical scan images may be represented as nodes of the graph representation. The first cluster may then be determined by identifying, using the GNN, a first subset of nodes that corresponds to the first object of interest while the second cluster may be determined by identifying, using the GNN, a second subset of nodes that corresponds to the second object of interest. The GNN may be trained to perform these tasks by extracting respective features of the nodes of the graph representation and identifying the first subset of nodes and the second subset of nodes based on the extracted features.

In examples, the graph representation described above may further includes a plurality of edges each connecting a corresponding pair of nodes and indicating whether the pair of nodes belongs to a same object of interest. Using such a graph representation, the one or more processors may be configured to identify the first subset of nodes based on a first set of one or more edges indicating that the first subset of nodes belongs to the first object of interest. Similarly, the one or more processors may be configured to identify the second subset of nodes based on a second set of one or more edges indicating that the second subset of nodes belongs the second object of interest. The edges may be labeled by the GNN with respective values or confidence scores to indicate whether a pair of nodes connected by an edge belongs to a same object. For example, an edge may be labeled as 1 or true to indicate that the nodes associated with the edge are connected (e.g., belonging to a same object) and an edge may be labeled as 0 or false to indicate that the nodes associated with the edge are disconnected (e.g., not belonging to a same object).

In examples, the graph representation described above may further include a plurality of edges each of which may connect a corresponding pair of nodes and represent a similarity between the pair of nodes. Using such a graph representation, the one or more processors may be configured to identify the first subset of nodes by identifying a first path that comprises one or more edges connecting the first subset of nodes. Similarly, the one or more processors may be configured to identify the second subset of nodes by identifying a second path that comprises one or more edges connecting the second subset of nodes. The first path may be identified as the longest path among multiple first candidate paths associated with the first subset of nodes, and the second path may be identified as the longest path among multiple second candidate paths associated with the second subset of nodes.

In examples, the one or more processors described above may be configured to identify the first subset of nodes and the second subset of nodes through an iterative process. During a first stage of the iterative process, the first subset of nodes associated with the first object of interest may be identified and then removed from the graph representation. The second subset of nodes associated with the second object may then be determined during a second stage of the iterative process from the remaining graph nodes.

In examples, the output medical scan image that depicts at least one of the first object of interest or the second object of interest may be generated by aligning at least a subset of the plurality of medical scan images based on the first cluster or the second cluster (e.g., based on the locations of the first or second object detected in the corresponding cluster) and averaging the subset of the plurality of medical scan images such that background and noise signals in the output medical scan image may be suppressed and contrast for the first or second object may be enhanced.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1B:
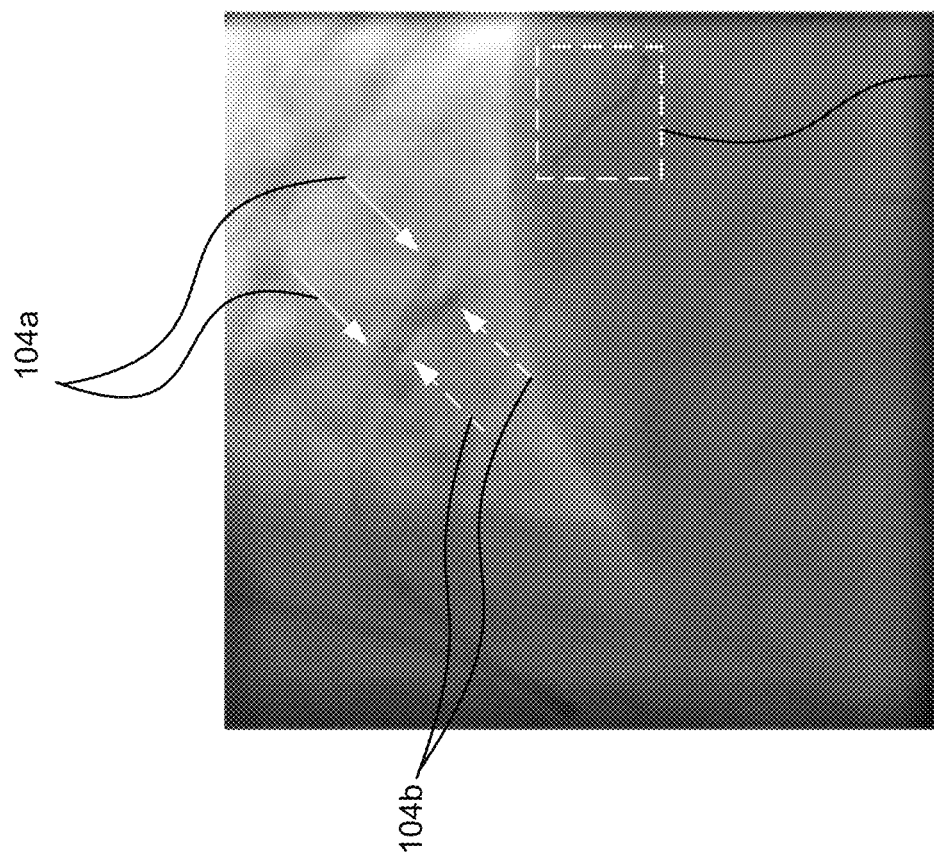
FIG. 1B is a diagram illustrating a first pair of balloon markers associated with a first stent and a second pair of balloon markers associated with a second.
Figure 1A:
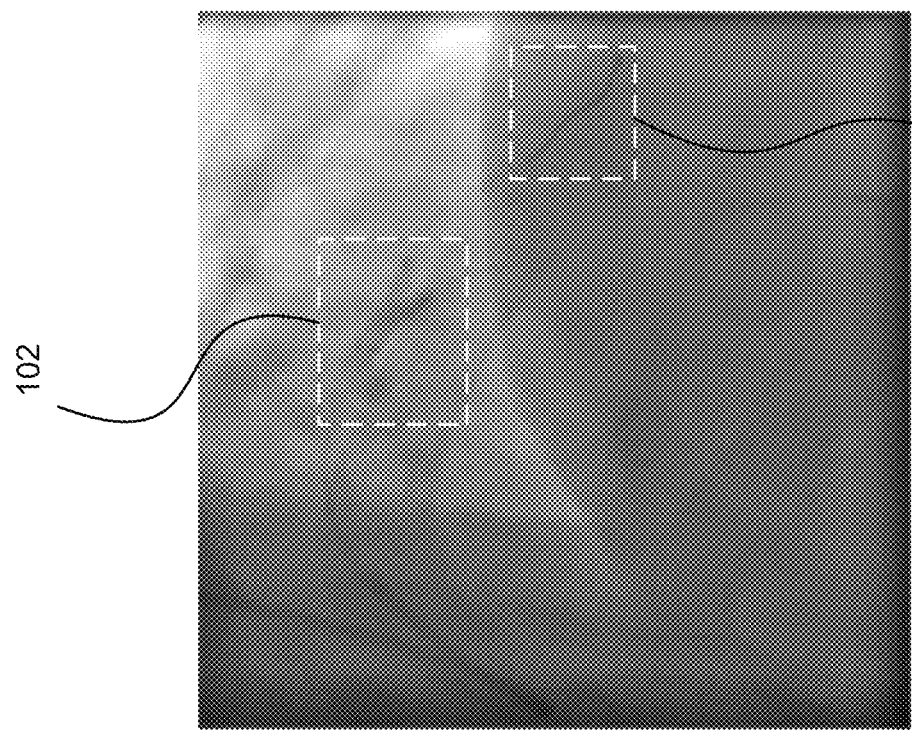
FIG. 1A is a diagram illustrating an example fluoroscopic image of a human heart that shows two stents placed inside the heart.

FIG. 1A illustrates an example fluoroscopic image of a human heart that shows two stents placed inside the heart (e.g., enclosed in dotted square 102 in FIG. 1A). Each of the stents may be associated with a respective pair of balloon markers, which may be respectively located at the two ends of the stent. FIG. 1B illustrates a first pair of balloon markers associated with a first stent (e.g., pointed to by arrows 104*a*) and a second pair of balloon markers associated with a second stent (e.g., pointed to by arrows 104*b*). Due to noise associated with the fluoroscopic image, there may be areas in the fluoroscopic image (e.g., the area enclosed in dotted square 106) that may resemble the appearance of a stent and that may be mistakenly identified as a stent as an image processing system or apparatus.

Embodiments may be described herein using fluoroscopic images and stents/balloon markers as examples. Those skilled in the art will appreciate, however, that the relevant techniques described in the embodiments may also be used to process other types of images and/or objects.

Figure 2:
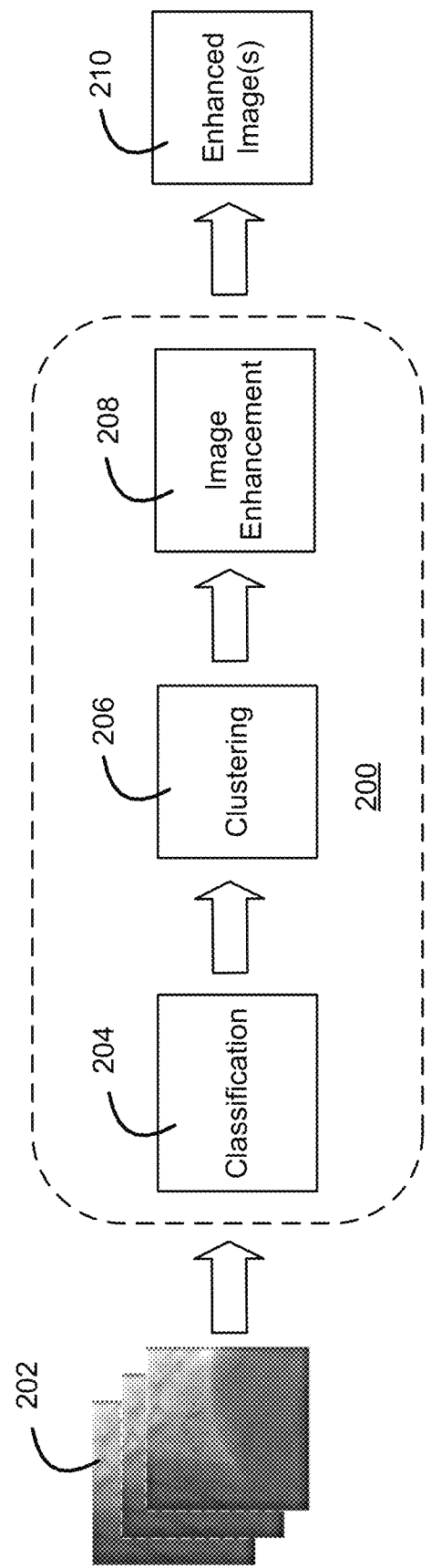
FIG. 2 is a diagram illustrating an example object detection apparatus in accordance with one or more embodiments described herein.

FIG. 2 is a simplified diagram illustrating an example object detection apparatus (ODA) 200 in accordance with one or more embodiments disclosed herein. As shown, ODA 200 may be configured to process medical scan images 202 and detect multiple objects (e.g., a first object, a second object, etc.) shown in the medical scan images. Medical scan images 202 may include different types of images including, for example, fluoroscopic images (e.g., shown in FIGS. 1A and 1B), MRI images, etc. The objects detected may also be of different types including, for example, anatomical structures of a human body (e.g., the apex point of a myocardium) and/or artificial structures (e.g., stents, guidewires, etc.) placed inside the human body.

ODA 200 may be configured to perform one or more of the following operations. At 204, ODA 200 may identify, in each medical scan image 202, a respective set of areas (e.g., patches in the medical scan image) that may correspond to the objects of interest (e.g., a first stent or a first pair of balloon markers, a second stent or a second pair of balloon markers, etc.). For example, ODA 200 may be configured to detect multiple candidate areas in each medical scan image 202 that may correspond to balloon markers, distinguish true marker areas from false marker areas (e.g., by removing the false marker areas from the list of candidate areas), and further identify which pair of balloon markers belongs to a same stent. In examples, ODA 200 may be configured to automatically detect, among medical scan images 202, one or more images where the objects of interest may be obscured by other objects (e.g., by contrast agents), and ODA 200 may be configured to remove those images from the processing operations at 204. In examples, ODA 200 may be configured to perform the tasks at 204 using one or more classification neural networks. In examples, the classification neural networks may include a deep neural network such as a convolutional neural network (CNN) that has been trained to extract features from each input medical scan image 202 and classify areas of the medical scan image as containing a balloon marker or not containing a balloon marker based on the extracted features. In examples, the one or more classification neural networks may include a graph neural network (GNN) that has been trained to determine (e.g., label) which areas of a list of candidate balloon marker areas (e.g., detected by the CNN mentioned above) are true marker areas and which areas of the list of candidate balloon marker areas are false marker areas. From the true marker areas, the GNN may further determine which pair of balloon markers belong to a same stent. The respective structures and training of the CNN and the GNN will be described in greater detail below.

Responsive to identifying areas in each input medical scan image 202 that may correspond to the objects of interests, ODA 200 may at 206 group the areas across multiple medical scan images 202 that may correspond to a same object into a respective cluster. For example, ODA 200 may group the areas in multiple medical scan images 202 that correspond to a first stent into a first cluster, group the areas in multiple medical scan images 202 that correspond to a second stent into a second cluster, etc. ODA 200 may then (e.g., at 208) utilize the clusters determined at 206 to enhance each object of interest in an output image. For example, ODA 200 may align multiple medical scan images 202 based on the locations of a first detected object (e.g., a first stent) indicated by a first cluster and generate a first output medical scan image (e.g., a first one of output image(s) 210) based on the aligned images so that background and noise signals in the first output medical scan image may be suppressed and contrast for the first detected object may be enhanced in the first output medical scan image. Similarly, ODA 200 may align multiple medical scan images 202 based on the locations of a second detected object (e.g., a second stent) indicated by a second cluster and generate a second output medical scan image (e.g., a second one of output image(s) 210) based on the aligned images so that background and noise signals in the second output medical scan image may be suppressed and contrast for the second detected object may be enhanced in the second output medical scan image. The enhancement may be achieved using various suitable techniques including, for example, by temporally averaging the multiple images (e.g., averaging respective pixel values of the images) after they have been aligned. In examples, outliers in each of the determined clusters may be removed before the cluster is used to generate the enhanced image(s). In examples, ODA 200 may output more images than the number of objects (e.g., the images may comprise duplicates of stents or false detections) and ODA 200 may provide a user with an interface to select/switch among these images (e.g., the output images may be sorted in a descending order based on their likelihood of containing a unique stent such as a stent not duplicated in previous images).

The clustering at 206 may be performed using various suitable techniques. In examples, the clustering may be performed at 209 using a mean-shift clustering technique during which features of the objects of interest (e.g., multiple stents) such as the respective angles, distances, and/or other characteristics (e.g., machined-learned characteristics) of balloon markers may be determined and assigned (e.g., as data points) iteratively towards a closest cluster centroid until each object in medical scan images 202 is assigned to a cluster. In examples, the clustering may be performed at 206 using machine-learning (ML) techniques such as using a graph neural network classifier, where the objects of interest (e.g., stents or balloon marker pairs) may be represented as nodes of a graph and the graph neural network may be used to classify (e.g., label) whether certain nodes may belong to a same stent (thus a same cluster). Examples of ML based techniques will be described in greater detail below.

Figure 3:
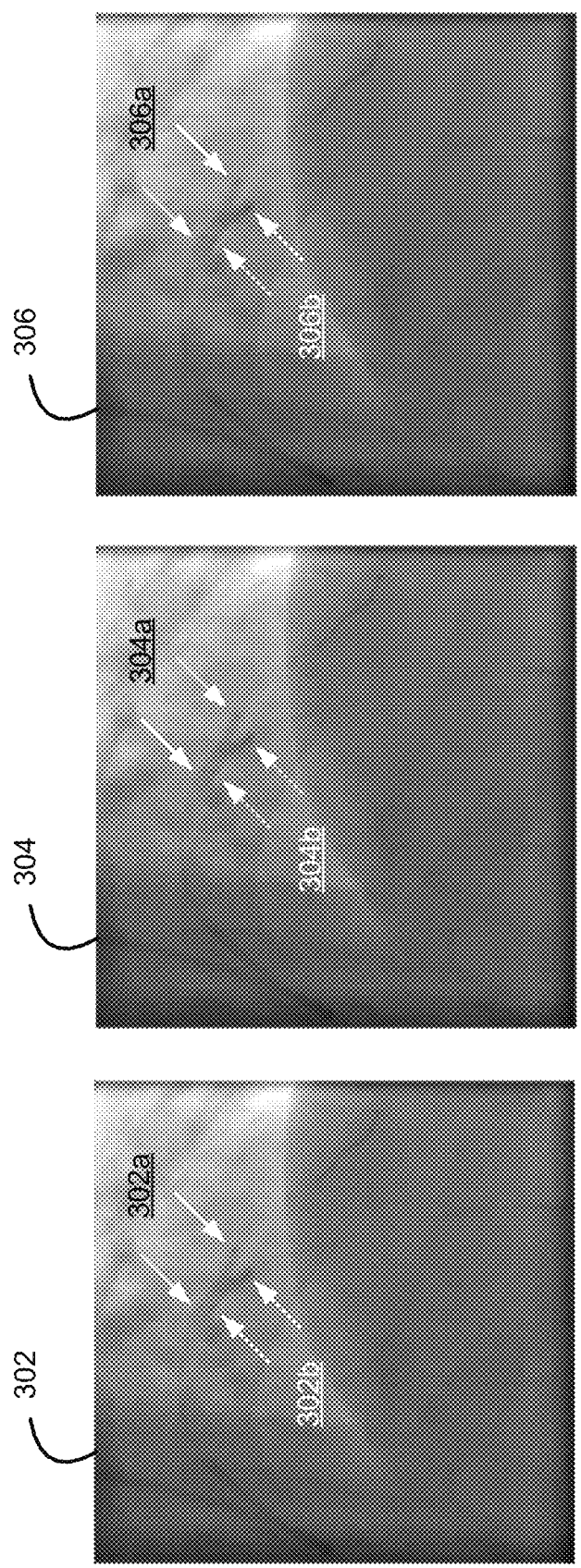
FIG. 3 is a diagram illustrating an example of clustering and enhancing objects based on multiple medical scan images in accordance with one or more embodiments described herein.

FIG. 3 is a diagram illustrating an example of clustering and enhancing objects based on multiple medical scan images. As shown, an object detection apparatus described herein (e.g., ODA 200 of FIG. 2) may be configured to receive multiple medical scan images (e.g., 302, 304 and 306) and automatically detect balloon marker pairs (or corresponding stents) 302a and 302b in scan image 302, detect balloon marker pairs (or corresponding stents) 304a and 304b in scan image 304, and detect balloon marker pairs (or corresponding stents) 306a and 306b in scan image 306. Using one or more of the clustering techniques described herein (e.g., mean-shift and/or ML based clustering techniques), the object detection apparatus may determine that balloon marker pairs 302a, 304a, and 306a belong to a first cluster (e.g., associated with a first stent), and that balloon marker pairs 302b, 304b, and 306b belong to a second cluster (e.g., associated with a second stent). The object detection apparatus may then align medical scan images 302, 304 and 306 (e.g., by aligning the respective locations of balloon marker pairs 302a, 304a, and 306a that belong to the first cluster) and the object detection apparatus may generate a first output scan image with an enhanced first stent based on the aligned images. Similarly, the object detection apparatus may also align medical scan images 302, 304 and 306 by aligning the respective locations of balloon marker pairs 302b, 304b, and 306b (belonging to the second cluster) and the object detection apparatus may generate a second output scan image with an enhanced second stent based on the aligned images. As described herein, the object detection apparatus may enhance the first and/or second stents by averaging medical scan images 302, 304 and 306 (e.g., averaging respective pixel values of the scan images) after the images have been aligned.

Figure 4A:
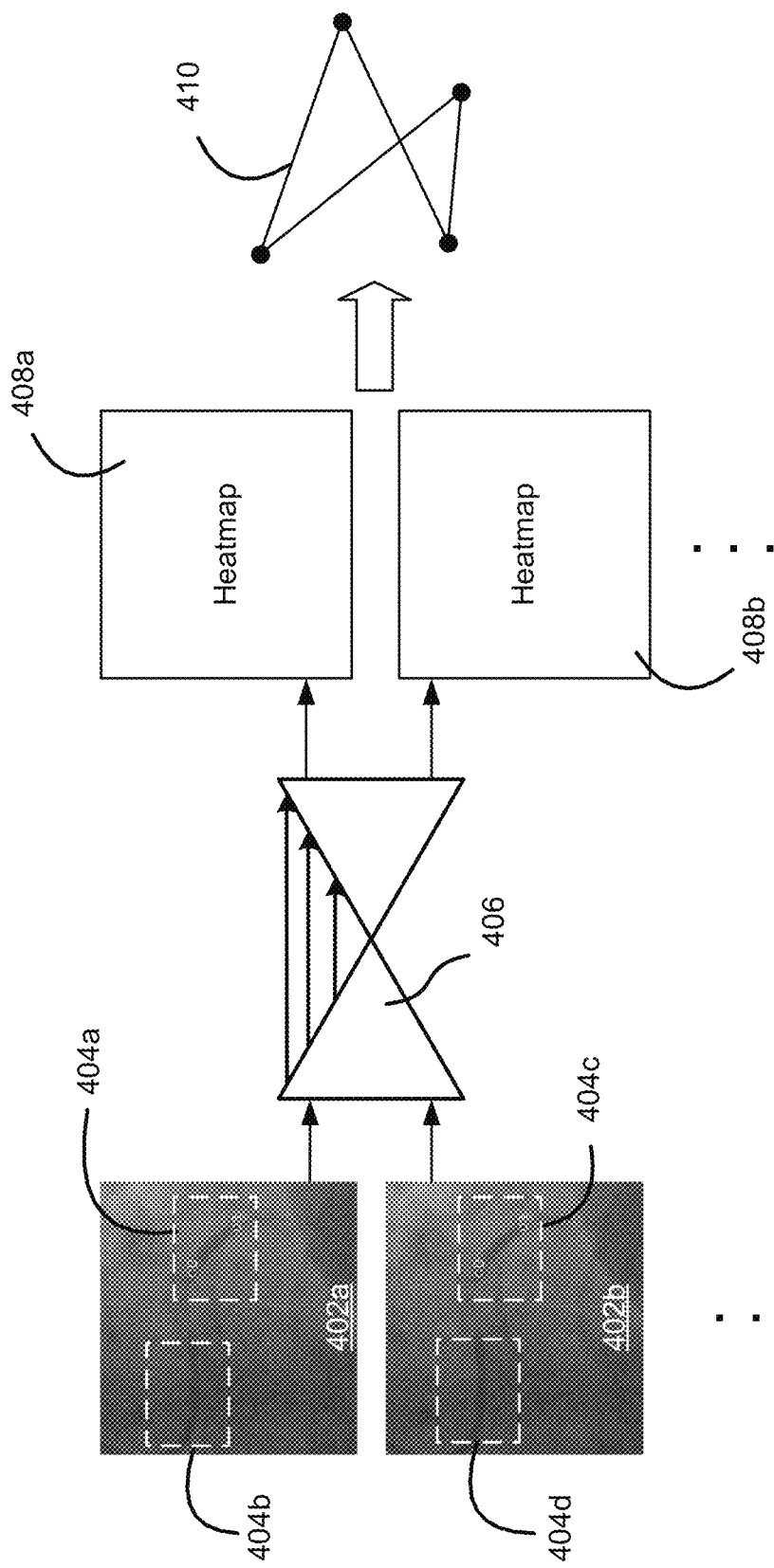
FIG. 4A and FIG. 4B are diagrams illustrating example machine learning techniques that may be used to automatically detect and/or cluster objects based on input medical scan images of the objects in accordance with one or more embodiments described herein.
Figure 4B:
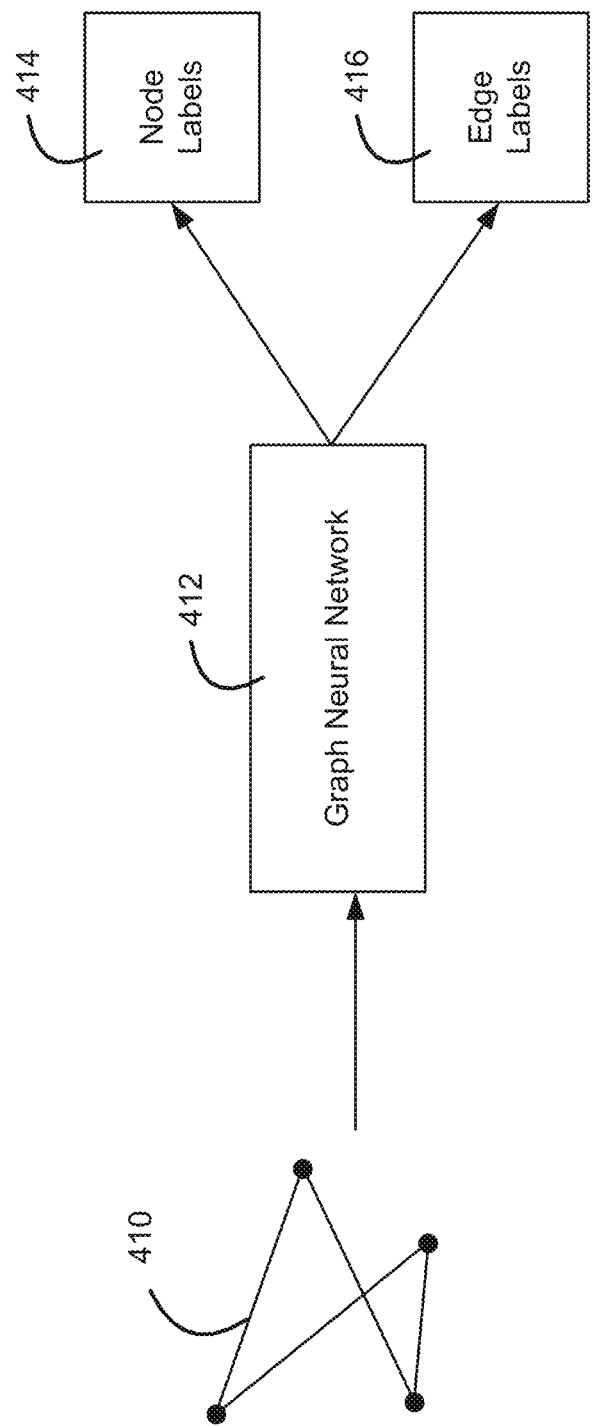

FIG. 4A and FIG. 4B illustrate example machine learning techniques that may be used to automatically detect and/or cluster objects based on input medical scan images of the objects. As shown in FIG. 4A, the example ML techniques may utilize one or more artificial neural networks (ANN) 406 that may be trained to extract features from input medical scan images (e.g., 402a, 402b, etc.) and predict areas (e.g., 404a, 404b, 404c, 404d, etc.) in each input medical scan image that may correspond to the objects of interest. ANN 406 may include, for example, a fully convolutional neural network (CNN) having an encoder-decoder structure (e.g., a U-Net structure). Such a CNN may include multiple convolutional layers and/or one or more pooling layers. The convolutional layers may be followed by batch normalization and/or linear or non-linear activation (e.g., such as rectified linear unit or ReLU activation). Each of the convolutional layers may include a plurality of convolution kernels or filters with respective weights, the values of which may be learned through a training process so as to extract features from medical scan images 402a, 402b, etc. The features extracted by the convolutional layers may be down-sampled through one or more pooling layers to obtain a representation of the features, for example, in the form of one or more feature maps. The CNN may also include one or more un-pooling layers and one or more transposed convolutional layers. Through the un-pooling layers, the CNN may up-sample the features extracted from the input medical scan images and further process the up-sampled features through the one or more transposed convolutional layers (e.g., via a plurality of deconvolution operations) to derive one or more up-scaled or dense feature maps. The dense feature maps may then be used to predict the locations of the objects of interest in input medical scan images 402a, 402b, etc. The predicted locations or areas may be indicated, for example, with respective heatmaps or Gaussian response maps (e.g., 408a, 408b, etc.) that correspond to the input medical scan images.

Due to similarities between the objects of interest and certain background areas in input medical scan images 402a, 402b, etc., the object locations or areas (e.g., 404a-404d) may include true positives (e.g., areas 404a and 404c, which may truly include the objects of interest) and false positives (e.g., background areas 404b and 404d, which may have been mistakenly identified as the objects of interest). To distinguish the true positives from the false positives, a graph representation (e.g., 410) of the predicted object locations or areas (e.g., 404a-d) may be created and the graph representation may be processed through a graphical neural network such that the true/false object areas may be labeled as such by the graphical neural network. Graph representation 410 (e.g., a data structure representing a graph) may include nodes and edges. Each node of graph representation 410 may correspond to a data structure configured to store information (e.g., features) about a respective predicted object (e.g., a balloon marker pair) and each edge of graph representation 410 may correspond to a data structure configured to store information (e.g., similarity) between two predicted objects (e.g., represented by corresponding graph nodes) associated with the graph edge. For example, in the example in shown in FIG. 4A, the nodes of graph representation 410 may correspond to data structures storing information (e.g., features) about predicted object areas 404a, 404b, 404c and 404d, respectively, and the edges of graph representation 410 may correspond to data structures storing information about the respective similarities between areas 404a and 404c, between areas 404a and 404d, between areas 404b and 404c, and between areas 404b and 404d, respectively. By representing the geometric and/or spatial features of predicted object areas 404a-404d with the nodes and edges of graph representation 410, the problem of object detection may be converted into a problem of graph node labeling and solved using a graph neural network (GNN) such as a message passing graph neural network.

FIG. 4B illustrates an example of a GNN (e.g., 412) that may be used to determine which of the detected areas 404a-404d may be true or false object areas and/or which pairs of detected areas may be associated with the same object (e.g., a confidence score or value may be used to indicate the likelihood of certain detected areas being associated with the same object). In examples, GNN 412 may include an encoder network, a core network, and/or a decoder network. The encoder network may be trained to receive graph representation 410 and extract respective features from the nodes of the graph representation and the edges of the graph representation. The core network may be trained to estimate respective states (e.g., current features) of the nodes and edges of graph representation 410 based on the features extracted by the encoder network, while the decoder network may be trained to indicate (e.g., with node labels 414) which nodes (e.g., detected objects) of graph representation 410 truly represent the objects of the interest and which nodes of graph representation 410 falsely represent the objects of the interest. The decoder network may also be configured to indicate (e.g., with edge labels 416) which edge(s) of graph presentation 410 may connect nodes associated with the same object. For example, the decoder network may label an edge that connects two nodes representing the same object (e.g., 302a and 304a in FIG. 3 or 302b and 304b in FIG. 3) with a value of 1 (e.g., or with a value of "true" or a high confidence score) and the decoder network may label an edge that does not connect two nodes representing the same object with a value of 0 (e.g., or with a value of "false" or a low confidence score).

The encoder network of GNN 412 may include a multi-layer perceptron (MLP) neural network (e.g., a fully connected neural networks) comprising an input layer, an output layer, and one or more hidden layers having respective linearly or non-linearly-activating nodes (e.g., perceptrons) that may be trained to encode extracted features into a feature representation (e.g., a feature vector). The core network of GNN 412 may include a recurrent neural network (e.g., RNN) or a cascade neural network that may be trained to receive the feature representation encoded by the encoder network and determine (e.g., iteratively) the respective states (e.g., current features) of each graph node and each graph edge of graph representation 410 based on the features of other graph nodes and graph edges. The decoder network of GNN 412 may include a fully-connected neural network trained to determine (e.g., label) the true/false statuses of the graph nodes based on respective final states (e.g., final features) of the graph nodes and the graph edges after the iterative update process describe above. For example, the decoder network may label a graph node as a true object area (e.g., truly including a pair of balloon markers) if the graph node possesses a first set of features and the decoder network may label a graph node as a false object area (e.g., not including a pair of balloon markers) if the graph node possesses a second set of features. The decoder network may learn these features and/or the true/false labels associated with the features through a training process.

The graphical neural network described herein may be used to facilitate the clustering of objects detected in multiple medical scan images (e.g., operations associated with 206 of FIG. 2). For example, a graphical neural network described herein (e.g., GNN 412) may take graph representation 410 as an input and may label edges of the graph representation that connect nodes associated with the same object with a first value (e.g., as 1, which may indicate that the edges or the nodes associated with the edges are connected). The graphical neural network may label other edges of the graph representation with a second value (e.g., as 0, which may indicate that the edges or the nodes associated with the edges are disconnected). The clustering of objects may then be accomplished by finding groups of connected components (e.g., one or more groups of nodes), where each group of such connected components (e.g., nodes) may represent a cluster. For example, a first cluster (e.g., a first group or subset of nodes) associated with a first object of interest may be identified by identifying a first set of one or more edges indicating that the nodes connected by the one or more edges belong to the first object of interest. Similarly, a second cluster (e.g., a second group or subset of nodes) associated with a second object of interest may be identified by identifying a second set of one or more edges indicating that the nodes connected by the one or more edges belong to the second object of interest.

In examples, the graphical neural network described herein may be configured to generate edge labels (e.g., continuous edge labels) that represent the similarity of the graph nodes connected by an edge. The clustering described herein may be performed based on a path length associated with a set of graph nodes (e.g., representing corresponding image areas or patches that contain a stent). Such an edge path length may be calculated, for example, as a sum of the respective labels (e.g., label values) of the edges that connect a set of graph nodes and the edge path length may represent the similarity among the set of graph nodes. As such, a longer edge path length (e.g., a greater number of graph edges) may indicate that the nodes on the path have a higher likelihood of belonging to the same object (e.g., same stent). In examples, a longest edge path may be determined (e.g., among multiple candidate edge paths) using the graph neural network described herein and the nodes on the edge path may be grouped into a first cluster (e.g., belonging to a first stent). Next, these nodes may be removed from the graph representation and another longest edge path (e.g., among multiple candidate edge paths) may be determined from the updated graph representation and used to identify nodes that belong to a second cluster (e.g., a second stent). This process may be repeat iteratively until a preset number of objects (e.g., stents) has been identified or a preset minimum path length has been reached. The number and/or length may be preset by a user, as described above.

In examples, the features of the nodes in graphical representation 410 may include a dimension that indicates whether a node is a seed node for clustering and the dimension may be used to facilitate the clustering. The seed node may represent a node of interest, which may be the node with the highest likelihood (e.g., confidence score) of being a real object of interest. The seed node may also represent an object selected by a user. The seed node (e.g., corresponding to a stent or a balloon marker pair) may be labeled as one (e.g., or true/positive) in the graph representation while the other nodes in the graph representation may be labeled as zero (e.g., or false/negative).

The graph neural network described herein may be trained to receive a graph representation as an input and determine, based on the respective features of the graph nodes and/or graph edges of the graph representation, which other graph nodes may be associated with the same object as a certain graph node (e.g., a positive graph node representing an object of interest) in the input. The graphical neural network may then classify (e.g., label) these other graph nodes as belonging to a same cluster as the positive graph node in the input. The classification may be performed iteratively for all of the objects of interest. For example, after identifying the nodes (e.g., a first subset of the nodes of the graph representation) that belong to a first stent in a first stage of the process, those nodes may be removed from the graph representation. Another node (e.g., representing a second stent) may then be selected (e.g., marked as a positive node) from the remaining graph nodes (e.g., during a second stage of the iterative process) and the graph neural network may repeat the operations described above to identify all graph nodes (e.g., a second subset of the nodes of the graph representation) that may be associated with the same stent (e.g., a second stent) as the newly selected graph node. In examples, this process may be repeated iteratively until a preset number of objects (e.g., stents) has been identified or a preset cluster size (e.g., a minimum cluster size) has been reached. The number and/or size (e.g., M) may be preset by a user (e.g., via a user interface provided by the object detection apparatus described herein), and the object detection apparatus described herein may automatically select the top M objects or clusters from a sorted list of identified objects or clusters to present to the user. The sorting may be performed, for example, based on a descending order of the likelihood (e.g., confidence score) that an identified object is a true positive.

In examples, the clustering described herein may be performed based on an edge path length (e.g., a number of graph edges) associated with a set of graph nodes (e.g., representing corresponding image areas or patches containing a stent). Such an edge path length may represent the similarity among the set of graph nodes and, as such, a longer edge path length (e.g., a greater number of graph edges) may indicate that the nodes on the path have a higher likelihood of belonging to the same object (e.g., same stent). Accordingly, a longest edge path may be determined (e.g., among multiple candidate edge paths) using the graph neural network described herein and the nodes on the edge path may be grouped into a first cluster (e.g., belonging to a first stent). Next, these nodes may be removed from the graph representation and another longest edge path (e.g., among multiple candidate edge paths) may be determined from the updated graph representation and used to identify nodes that belong to a second cluster (e.g., a second stent). This process may be repeat iteratively until a preset number of objects (e.g., stents) has been identified or a preset minimum path length has been reached. The number and/or length may be preset by a user, as described above.

Figure 5:
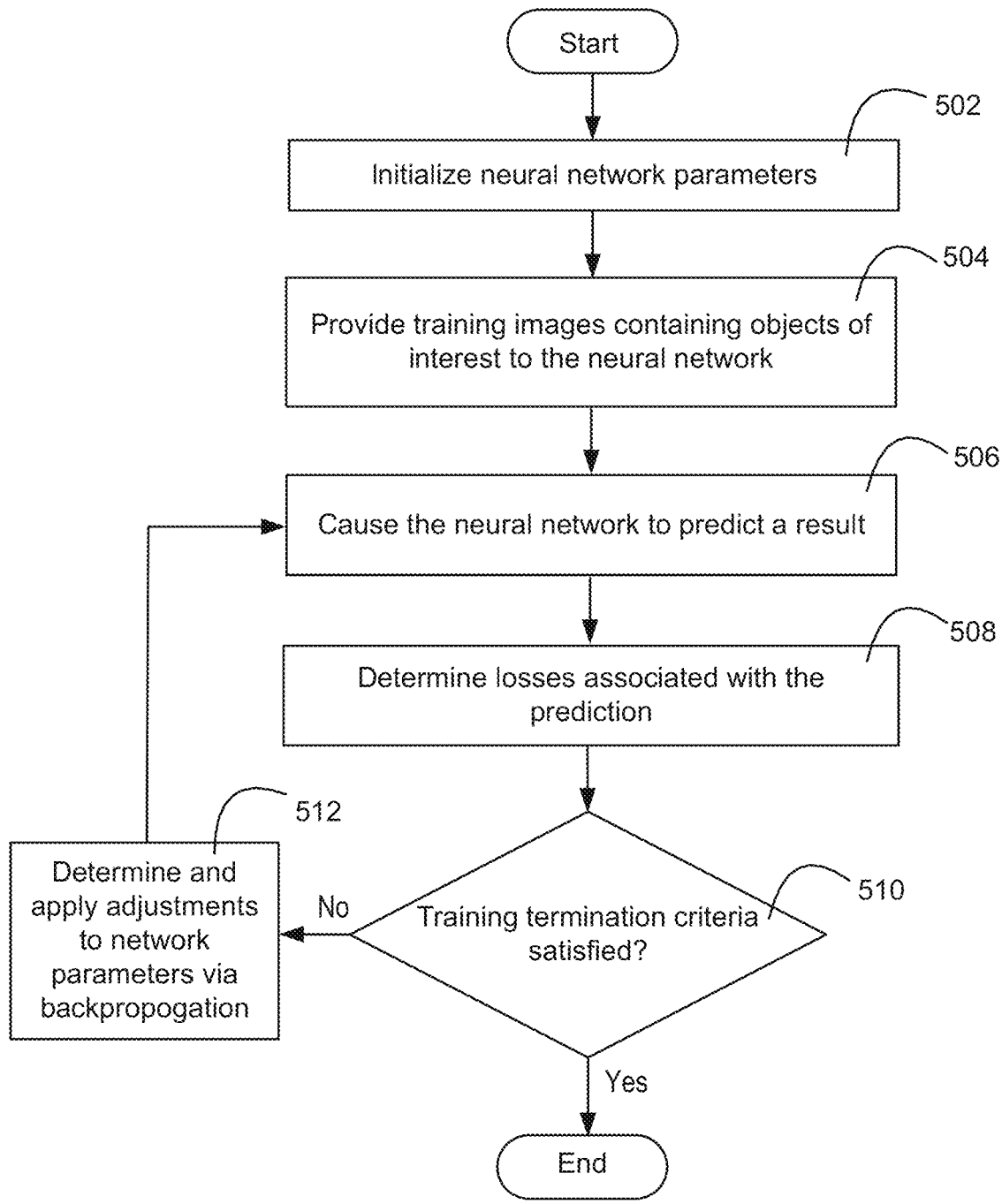
FIG. 5 is a flow diagram illustrating example operations that may be associated with training a neural network to perform one or more of the tasks described in accordance with one or more embodiments described herein.

FIG. 5 illustrates example operations that may be associated with training a neural network (e.g., the various classification neural networks and/or graphical neural networks described herein) to perform one or more of the object detection tasks described herein. As shown, the training operations may include initializing the parameters of the neural network (e.g., weights associated with the various filters or kernels of the neural network) at 502. The parameters may be initialized, for example, based on samples collected from one or more probability distributions or parameter values of another neural network having a similar architecture. The training operations may further include providing training data (e.g., medical scan images comprising multiple objects of interest such as multiple stents) to the neural network at 504, and causing the neural network to predict a result at 506. Depending on the functions that the neural network is designed to perform, the predicted result may be, for example, a set of image features associated with an object of interest or a graph node, a set of features of a graph edge representing a relationship (e.g., similarity) between two graph nodes, a true/false label of a graph node, etc. At 508, the predicted result may be compared with a ground truth to determine a loss associated with the prediction. The loss may be determined using a suitable loss function such as, e.g., mean squared errors (MSE), L1 norm, L2 norm, etc. Once determined, the loss may be evaluated at 510 to determine whether one or more training termination criteria have been satisfied. For example, a training termination criterion may be deemed satisfied if the loss(es) described above is below a predetermined thresholds, if a change in the loss(es) between two training iterations (e.g., between consecutive training iterations) falls below a predetermined threshold, etc. If the determination at 510 is that a training termination criterion has been satisfied, the training may end. Otherwise, the loss may be backpropagated (e.g., based on a gradient descent associated with the loss) through the neural network at 512 before the training returns to 506.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 6:
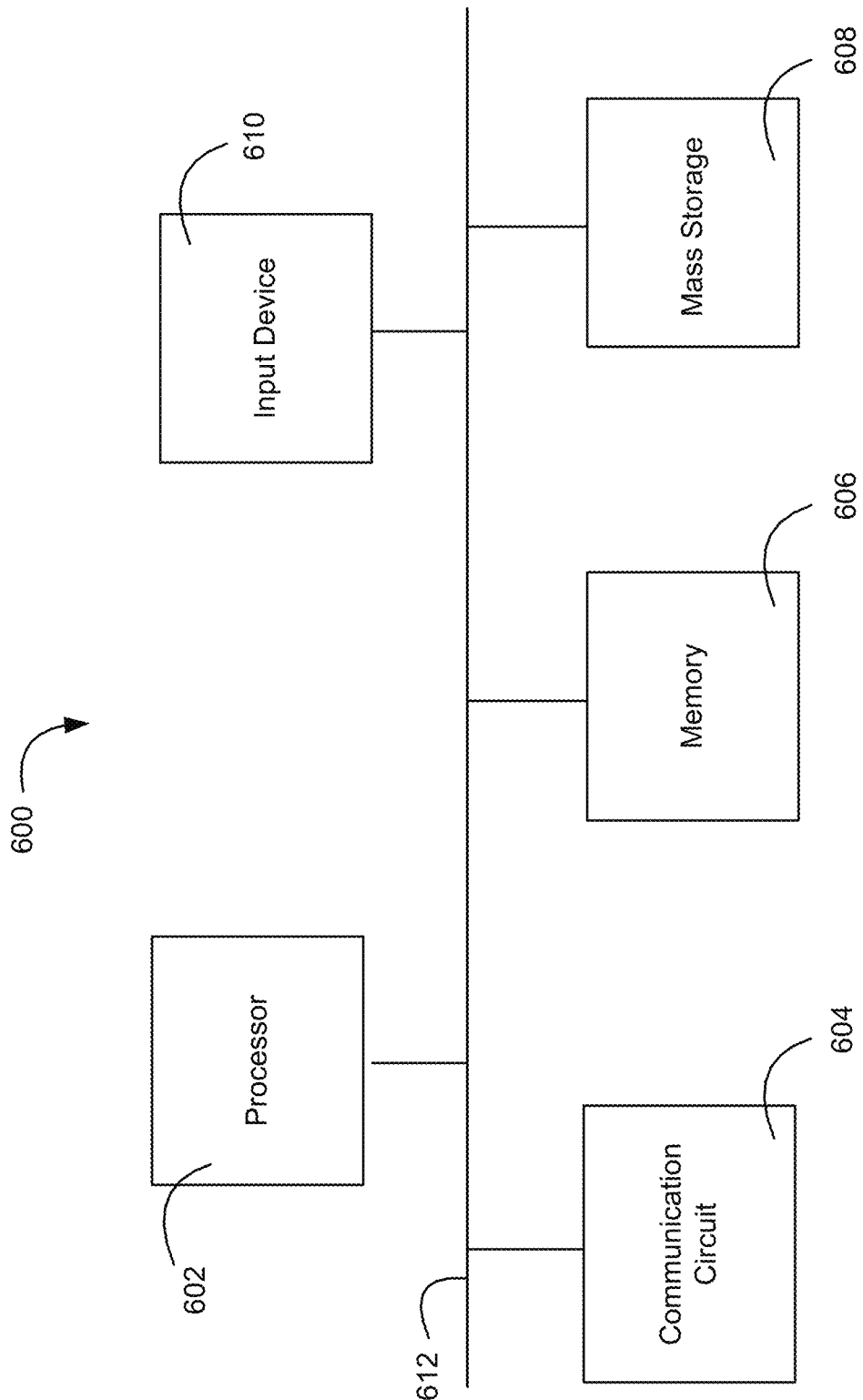
FIG. 6 is a block diagram illustrating example components of an apparatus that may be configured to perform one or more of the tasks described in accordance with one or more embodiments described herein.

The systems, methods, and/or instrumentalities described herein may be implemented using one or more processors, one or more storage devices, and/or other suitable accessory devices such as display devices, communication devices, input/output devices, etc. FIG. 6 is a block diagram illustrating an example apparatus 600 that may be configured to perform the object detection tasks described herein. As shown, apparatus 600 may include a processor (e.g., one or more processors) 602, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 600 may further include a communication circuit 604, a memory 606, a mass storage device 608, an input device 610, and/or a communication link 612 (e.g., a communication bus) over which the one or more components shown in the figure may exchange information.

Communication circuit 604 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 602 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 608 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 602. Input device 610 may include a keyboard, a mouse, a voice-controlled input device, a touch sensitive input device (e.g., a touch screen), and/or the like for receiving user inputs to apparatus 600.

It should be noted that apparatus 600 may operate as a standalone device or may be connected (e.g., networked, or clustered) with other computation devices to perform the functions described herein. And even though only one instance of each component is shown in FIG. 6, a skilled person in the art will understand that apparatus 600 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
one or more processors configured to:
receive a plurality of medical scan images, wherein each medical scan image depicts at least a first object of interest and a second object of interest;
identify, using one or more artificial neural networks, a respective first area and a respective second area in each of the plurality of medical scan images, wherein the first area corresponds to the first object of interest and the second area corresponds to the second object of interest;
determine a graph representation of the respective first area and the respective second area in each of the plurality of medical scan images, wherein the respective first area and the respective second area in each of the plurality of medical scan images are represented as nodes of the graph representation;
determine, by processing the graph representation through a graphical neural network (GNN), a first cluster that includes the respective first area in each of the plurality of medical scan images;
and a second cluster that includes the respective second area in each of the plurality of medical scan images, wherein the first cluster is determined by identifying, using the GNN, a first subset of nodes that corresponds to the first object of interest, and wherein the second cluster is determined by identifying, using the GNN, a second subset of nodes that corresponds to the second object of interest; and
generate an output medical scan image depicting at least one of the first object of interest based on the first cluster or the second object of interest based on the second cluster.

2. The apparatus of claim 1, wherein the one or more processors being configured to identify the respective first area in each of the plurality of medical scan images comprises the one or more processors being configured to determine one or more first candidate areas in each of the plurality of medical scan images and selecting the first area from the one or more first candidate areas, and wherein the one or more processors being configured to identify the respective second area in each of the plurality of medical scan images comprises the one or more processors being configured to determine one or more second candidate areas in each of the plurality of medical scan images and selecting the second area from the one or more second candidate areas.

3. The apparatus of claim 1, wherein the one or more processors are configured to determine, based on the plurality of medical scan images, first features associated with the first object of interest and second features associated with the second object of interest, the one or more processors further configured to determine the first cluster based on the first features and the second cluster based on the second features.

4. The apparatus of claim 1, wherein the GNN is trained to extract respective features of the nodes of the graph representation and identify the first subset of nodes and the second subset of nodes based on the extracted features.

5. The apparatus of claim 1, wherein the graph representation further includes a plurality of edges each connecting a corresponding pair of nodes and indicating whether the pair of nodes belongs to a same object of interest, wherein the first subset of nodes is identified based on a first set of one or more edges indicating that the first subset of nodes belongs to the first object of interest, and wherein the second subset of nodes is identified based on a second set of one or more edges indicating that the second subset of nodes belongs the second object of interest.

6. The apparatus of claim 1, wherein the graph representation further includes a plurality of edges each connecting a corresponding pair of nodes and representing a similarity between the pair of nodes, wherein the one or more processors are configured to identify the first subset of nodes by identifying a first path that comprises one or more edges connecting the first subset of nodes, and wherein the one or more processors are configured to identify the second subset of nodes by identifying a second path that comprises one or more edges connecting the second subset of nodes.

7. The apparatus of claim 6, wherein the first path is identified as a longest path among multiple first candidate paths associated with the first subset of nodes, and wherein the second path is identified as a longest path among multiple second candidate paths associated with the second subset of nodes.

8. The apparatus of claim 1, wherein the one or more processors are configured to identify the first subset of nodes during a first stage of an iterative process, remove the first subset of nodes from the graph representation, and identify the second subset of nodes during a second stage of the iterative process.

9. The apparatus of claim 1, wherein the one or more processors being configured to generate the output medical scan image depicting at least one of the first object of interest or the second object of interest comprises the one or more processors being configured to enhance the at least one of the first object of interest or the second object of interest based on the first cluster or the second cluster.

10. The apparatus of claim 9, wherein the one or more processors being configured to enhance the at least one of the first object of interest or the second object of interest in the output medical scan image comprises the one or more processors being configured to:
   align at least a subset of the plurality of medical scan images based on the first cluster or the second cluster; and
   generate the output medical scan image based on an average of the subset of the plurality of medical scan images.

11. The apparatus of claim 1, wherein the plurality of medical scan images includes one or more fluoroscopic images and wherein at least one of the first object of interest or the second object of interest includes a stent.

12. A method for processing medical scan images, the method comprising:
   receiving a plurality of medical scan images, wherein each medical scan image depicts at least a first object of interest and a second object of interest;
   identifying, using one or more artificial neural networks, a respective first area and a respective second area in each of the plurality of medical scan images, wherein the first area corresponds to the first object of interest and the second area corresponds to the second object of interest;
   determining a graph representation of the respective first area and the respective second area in each of the plurality of medical scan images, wherein the respective first area and the respective second area in each of the plurality of medical scan images are represented as nodes of the graph representation;
   determining a first cluster that includes the respective first area in each of the plurality of medical scan images and a second cluster that includes the respective second area in each of the plurality of medical scan images, wherein the first cluster is determined by identifying, using the GNN, a first subset of nodes that corresponds to the first object of interest, and wherein the second cluster is determined by identifying, using the GNN, a second subset of nodes that corresponds to the second object of interest; and
   generating an output medical scan image depicting at least one of the first object of interest based on the first cluster or the second object of interest based on the second cluster.

13. The method of claim 12, further comprising determining, based on the plurality of medical scan images, first features associated with the first object of interest and second features associated with the second object of interest, wherein the first cluster is determined based on the first features and the second cluster is determined based on the second features.

14. The method of claim 12, wherein the GNN is trained to extract respective features of the nodes of the graph representation and identify the first subset of nodes and the second subset of nodes based on the extracted features.

15. The method of claim 12, wherein the graph representation further includes a plurality of edges each connecting a corresponding pair of nodes and indicating whether the pair of nodes belongs to a same object of interest, wherein the first subset of nodes is identified based on a first set of one or more edges indicating that the first subset of nodes belongs to the first object of interest, and wherein the second subset of nodes is identified based on a second set of one or more edges indicating that the second subset of nodes belongs the second object of interest.

16. The method of claim 12, wherein the graph representation further includes a plurality of edges each connecting a corresponding pair of nodes and representing a similarity between the pair of nodes, wherein the first subset of nodes is identified by identifying a first path that comprises one or more edges connecting the first subset of nodes, and wherein the second subset of nodes is identified by identifying a second path that comprises one or more edges connecting the second subset of nodes.

* * * * *